Aug. 3, 1965
A. R. NORDEN
3,198,992
CIRCUIT BREAKER AND PANELBOARD
Filed Oct. 29, 1962
2 Sheets-Sheet 1
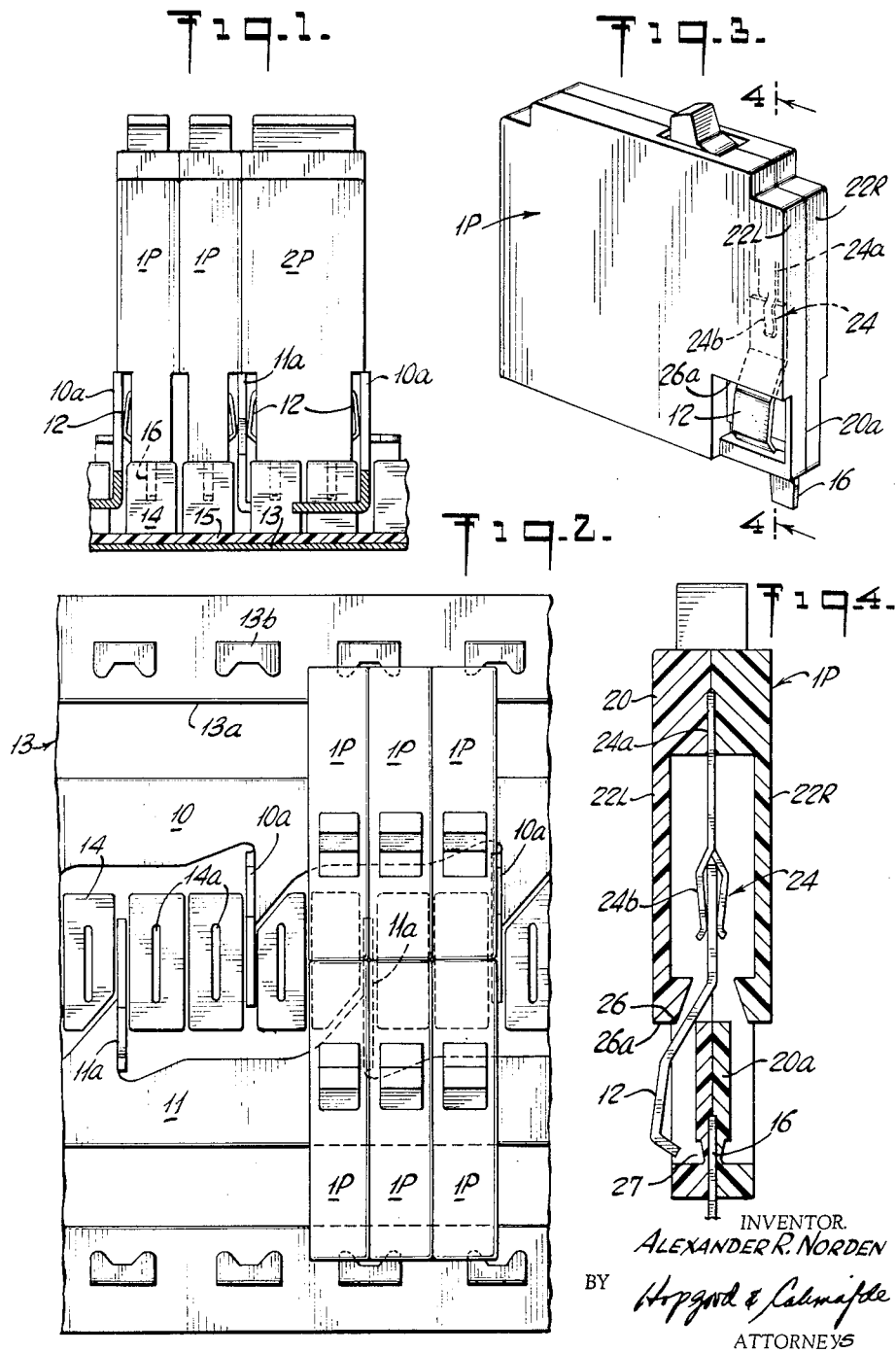
INVENTOR.
ALEXANDER R. NORDEN
BY
ATTORNEYS

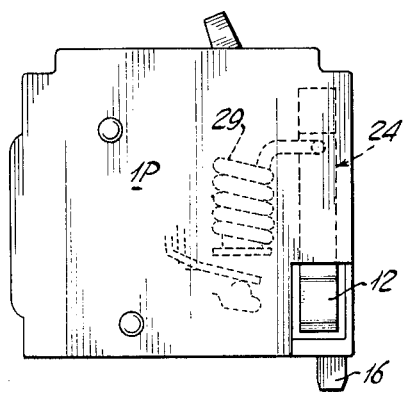
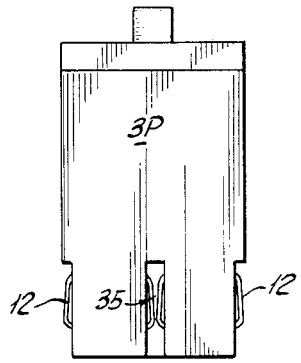
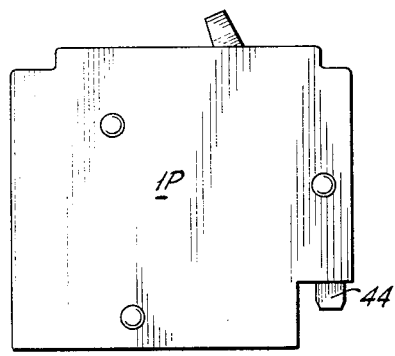
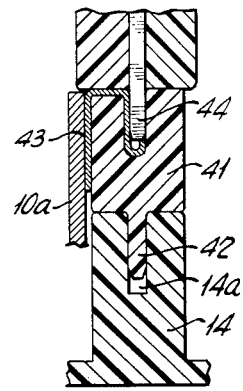
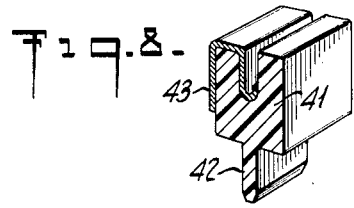
INVENTOR.
ALEXANDER R. NORDEN
BY
ATTORNEY

United States Patent Office 3,198,992
Patented Aug. 3, 1965

3,198,992
CIRCUIT BREAKER AND PANELBOARD
Alexander R. Norden, New York, N.Y., assignor to Murray Manufacturing Corporation, Brooklyn, N.Y., a corporation of New York
Filed Oct. 29, 1962, Ser. No. 233,738
21 Claims. (Cl. 317—119)

This invention relates to circuit breakers and panels or load centers and more particularly to circuit breaker units for connection to bus blades such as shown, for example, in Patent No. 2,934,660, assigned to Murray Manufacturing Corporation.

The load center or panelboard has two or more opposite polarity line or power buses from which contact blades project in a parallel array, the blades of one bus being located between two successive blades of opposite polarity whereby any two adjacent bus blades belong to the respective, different polarity buses.

Circuit breaker units, with circuit protective thermal or magnetic trips, are applied to the bus blades to connect the buses to load circuits. The known circuit breaker unit has a receptive contact clip centered at the lower front corner and may be defined here, for convenience, as a clip-on unit. The clip-on unit, when applied to a bus blade, sits astride the blade, with the contact clip gripping the opposite sides of the blade. The standard blade length in the panelboard permits engagement of the blade by two clip-on units in front end abutment with each other. The number of clip-on pairs engageable with bus blades equals the number of blades.

In recent years, the capacity of the panelboard has been increased by a dual breaker utilizing a single clip-on unit. The conventional dual breakers are contained in a housing of substantially the same external dimensions as the single pole breaker. Both poles of the dual breaker then receive power of the same polarity from the clipped blade. When the one-pole or dual clip-on unit is on a bus blade, half of its breadth or thickness overhangs each blade side. It is evident that two clip-on units can engage adjacent blades only if the thickness of each unit does not exceed the spacing between blades. Reducing the thickness of the conventional single pole or dual units below the optimum is not significant as it will not enable a greater number of clip-on units to engage the blades.

The invention provides a novel, side contacting breaker unit suitable for use with panelboards employing a bus structure such as described above for the clip-on type of circuit breaker. The novel circuit breaker is characterized by a contact surface at the side for engagement with only one side of the bus blade, the novel subject unit then being located only to the side of the blade. Two of the side contacting breakers can engage the opposite sides of the same section of the bus blade. The spacing of the side contacting surface to the front end of the breaker in the novel unit is substantially equal to the clip-on unit, whereby two of the novel units in front end abutment can engage the same side of a standard length bus blade in the load center.

Unlike the clip-on unit, a reduction in thickness of the novel unit is significant. By making it half as thick as the distance between adjacent blades, two of them can be fitted side by side between these blades, one unit engaging one side of one blade and the other unit engaging the facing side of the adjacent blade. Each of the half-thickness or side contacting units constitutes a single pole breaker including the associated protective trip. In terms of load center capacity, twice as many thin units can be connected to a given set of bus blades as compared to the standard width single pole clip-on units, and the same number of thin poles as compared to the dual clip-on units.

An advantage of the thin, side contacting breaker units is that with proper bus arrangement, the end pair of half-width poles, at each of the four positions, can be of opposite polarity, thus making all poles in a panel suitable for use on multiwire (opposite polarity) circuits. For example, a device fitted with two blades can accommodate four full size or four dual breakers of the clip-on type. In either case, there are only two pairs of adjacent opposite polarity poles. The bussing for the novel breakers may be so arranged that with the same breaker plug-in area and configuration available in a panelboard four adjacent opposite polarity pairs are available.

Another advantage of the novel thin breaker units is that in a panelboard having an odd number of bus blades of different polarity within a given plug-in area, a larger number of multipole connections can be made than with the clip-on units.

An object of the invention also resides in a two-pole side contacting breaker unit characterized by contact surfaces at its opposite sides, one contact surface for each of its two poles. This two-pole side contacting unit will be twice the thickness of the thin side contacting unit, so as to be accommodated between a pair of adjacent bus blades, one contact surface engaged with one side of one of the blades and the other contact surface engaged with the facing side of the adjacent blade. Each pole in the novel two-pole unit therefore connects to a different bus and is of different polarity.

Another advantage of the novel two-pole unit mounted between adjacent blades, is that two thin units (occupying the width of one standard single pole breaker) may be used as two single pole units or as one double pole unit, providing, of course, that the load center busses are of opposite polarity.

To afford side contact surface, the subject breaker unit carries a contact blade which may be referred to, for convenience, as the breaker blade. Preferably, the breaker blade is releasably retained in the breaker unit and tensioned away from the side at which it is exposed. The blade may be snapped or sprung into position in the breaker unit or removed therefrom without removing any part of the housing or enclosure of the unit.

In the preferred embodiment the subject thin one-pole breaker unit has only one breaker blade, with means for interchangeably retaining the blade at either side. The breaker blade thus can be shifted from either side of the thin unit to the other side to suit the available side of a bus blade in a vacant breaker space of the load center panel. The blade could also be arranged for rotatable or laterally swingable displacement to either side, thus being permanently rather than removably connected.

It is a further object of the invention to provide means on the load center panel for operatively positioning the side-contacting one-pole or two-pole units with their breaker blade firmly flexed against the sides of the bus blades. The breaker blade is located at the lower front corner of a side of the subject breaker unit. This unit can be supported and hooked down at the rear by means such as disclosed in the aforementioned Patent 2,934,660.

The invention provides additional means for furnishing the required support for the breaker units at the front and for maintaining them in operative positions. More specifically, the load center base under the busses is provided with stands or posts projecting to positions alongside the bus blades and adapted to support the subject breaker units at the correct level. To key a subject unit in operative position, particularly to prevent lateral displacement and loss of engagement of the subject one-pole thin unit with a contiguous bus blade, the stand and breaker unit are provided with interengaging means, for instance a slot in the top of the stand and a dependent stab of the breaker unit fitting into the slot. Preferably, one stand is provided adjacent each side of a bus blade for a pair of the thin breaker units in front end abutment with each other, the slot in the stand having sufficient length for receiving the stabs of a pair of opposing units. The two-pole subject unit may be supported by or overlying a pair of stands or one appropriately dimensioned stand between adjacent bus blades and may have two stabs laterally spaced for engagement in the slots of the pair of stands.

If the side wiping contact is flush with a side of the breaker, the stand is necessary to support two end-to-end thin subject units, or either one of them, in operative relation to the bus blade. In this embodiment, if only half a stand is provided alongside a bus blade, only one thin unit can be set in operative relation to the side of the bus blade. If the two stands between adjacent bus blades are omitted, then it will not be possible to support reliably a two-pole subject unit in operative position between the blades. When full capacity is desired of a load center, it will have a full quota of supporting slotted stands. When a panel is to be limited to a certain number of breaker positions, it is merely necessary to omit one or more of the stands or slots in the stands, or provide an arrangement of stands for preventing operative positioning of one or more subject units, depending on the number and location of vacant breaker spaces required.

In accordance with a preferred embodiment of the invention, the side wiping contact is not flush with the side of the breaker, but rather is set in, leaving a shoulder formation to act as a stop for the forward travel of the front end of the breaker. In this embodiment, the front end of the breaker does not rest on the stand but simply overlies the stand with the breaker stab located in the stand slot.

A hybrid side contacting and clip-on 3-pole unit may be provided according to the invention for use on a 3-phase load center. The hybrid unit will have contact surfaces at the opposite sides and, in addition, will have a center receptive clip or wiping blade. The side contact surfaces can engage the sides of two bus blades for connection to two of the phases from a pair of busses and the clip grips an intermediate bus blade for connection to the third phase. It is thus possible to provide a 3-pole breaker in two-thirds of the space normally occupied by the standard unit.

The above mentioned and other features and objects of this invention and the manner of attaining them will become more apparent and the invention itself will be best understood by reference to the following description of an embodiment of the invention taken in conjunction with the accompanying drawing, in which FIG. 1 is a partly sectioned view of a portion of a load center for mounting the subject side contacting one-pole and two-pole units, two one-pole units and one two-pole unit being shown in operative positions:

FIG. 2 is a plan view showing a portion of the load center and subject one-pole breaker units thereon;

FIG. 3 is a perspective view of a novel breaker unit;

FIG. 4 is an enlarged sectional view on line 4—4 of FIG. 3;

FIG. 5 is a side view of the novel breaker unit of FIG. 3 illustrating trip-coil positioning;

FIG. 6 is a side view on a reduced scale of the hybrid 3-pole side contacting and clipping breaker unit;

FIG. 7 is an end sectional view of an alternative embodiment of the invention utilizing an adaptor equipped with a side-wiping contact member;

FIG. 8 is a perspective view of the adaptor; and

FIG. 9 is a side view of the circuit breaker for use with the adaptor.

The side contacting one-pole and two-pole breaker units, respectively designated 1p and 2p, are shown in FIG. 1 operatively positioned in a load center. Plan view FIG. 2 shows only operatively positioned one-pole units 1p.

The novel breaker units 1p and 2p are particularly applicable to load center panels with bussing and rear mounting arrangement of the type disclosed in assignee's Patent 2,934,660. On the panel are two different or opposite polarity power or line busses 10 and 11. Projecting from bus 10 are parallel bus blades 10a and projecting similarly from the bus 11 are parallel blades 11a, blades 11a being alternately disposed with blades 10a in an array along the panel span. Only a sufficient portion of the panel required for explanation of the invention is shown in FIGS. 1 and 2.

This portion of the panel has two blades 10a and 11a. Each blade is a length engageable, at either side, by a pair of units 1p or 2p in front end abutment, as may be understood from FIGURE 2. A two-pole unit 2p fits between a pair of adjacent blades 10a and 11a, as seen in FIGURE 1. The one-pole unit 1p is half the thickness of the two-pole unit and two of the thin units 1p may fit side by side between adjacent bus blades. The unit 1p carries a single breaker blade 12 at one side (also see FIGURES 3 and 4), near the front lower corner of the side. The two-pole unit 2p carries similarly located breaker blades 12 at the opposite sides. When operatively positioned, the unit 1p has its breaker blade firmly pressed against the side of a contiguous bus blade. In operative position of the unit 2p, its two breaker blades press respectively against the facing sides of the bus blades flanking the unit.

The breaker units 1p and 2p are supported at the rear by aprons 13a of the load center pan 13 and hooked down by hooks 13b on the aprons. The aprons and hooks are as shown in Patent 2,934,660 and the breaker units 1p and 2p are formed at the back, in similar manner as a clip-on unit disclosed in Patent 2,890,306, for engagement with the hooks. Whereas a clip-on unit when on a bus blade is laterally centered with respect to a hook, the clip-on unit 1p when in operative position is not so centered and will engage under one end of a hook, as indicated in FIGURE 2. A two-pole unit 2p when in operative position is hooked between two of the hooks 13b.

The subject side contacting units 1p and 2p also require lateral stability at the front particularly where only one thin unit is utilized in the space between two blades. For this purpose, the invention provides stands 14 integral with or attachable to insulating pad or pads 15 between the bottom of the pan 13 and the busses 10 and 11. As shown, there is one stand at each side of a bus blade and two stands, or one of equivalent size, between adjacent bus blades. The stands may also support the front ends of the breaker units 1p and 2p if the side wiping contact is flush with the breaker side. If the stands support the front end of the breakers, then the height of the stands must be such as to position the breakers level with the aprons 13a.

The unit 1p has a dependent key or stab 16 (also see FIGURE 3) of a breadth to fit, without significant lateral play, into a slot 14a in the top of the stand 14. The slot 14a is long enough to receive the stabs 16 of a pair of units 1p positioned end to end over the stand 14. A two-pole unit 2p is positioned over a pair of stands between adjacent bus blades and has stabs 16 fitting into the slots 14a of the two stands. As now understood, when a one-pole unit 1p is in operative position, it is keyed against lateral displacement and maintained with its breaker blade 12 firmly pressed against the contiguous side of a bus blade. Likewise, in the operative position of a two-pole breaker unit 2p, it is preferably, although not necessarily, stabilized by the key and slot means 16 and 14a against lateral play, so that its two breaker blades remain firmly in contact with the sides of flanking opposite polarity bus blades. If desired a double pole unit may be provided with only a single stab for mounting in a single properly located stand, thereby reducing the number of stabs and stands required. Sufficient support or lateral rigidity would be provided by such an arrangement.

If the side wiping contact is flush with the side of the breaker, the omission of a stand 14 from a station at the side of a bus blade prevents operative positioning of one-pole units 1p at the station. If both stands are omitted from between a pair of blades, neither one-pole units 1p nor two-pole units 2p will be operatively reliably positionable between these blades. Hence, in this embodiment it is only necessary to omit one or more of the stands to reduce the service of a load center to less than its full rated capacity.

However, in accordance with the preferred embodiment, the side wiping contact is set-in relative to the side of the breaker. The front end of the breaker is formed with a shoulder, as will be explained more fully hereinafter, which acts as a stop against forward travel of the front end of the breaker. In this embodiment, therefore, the stand need not support the front end of the breaker. The stab and slot combination, however, perform the same function of preventing lateral movement as described above.

The preferred embodiment of the single pole unit is shown in FIG. 3. Its construction for retaining the wiper contact 12 at either side, as chosen, is shown in FIGS. 4 and 5. The housing of the unit is formed of two halves the combination defining an inner core for inter alia forming a support and enclosure for the internal switch and trip structure. The housing halves 22L and 22R are fastened by conventional means.

A laterally centered clasp 24 is dependently anchored by its stem 24a to a forwardly located head portion 20 of the housing. Below the stem, the clasp comprises a pair of jaws 24b flared at their free, lower ends for guiding and returning the straight upper portion of the wiper contact 12 into the bite of the jaws. The clasp is made of conductive metal, which is preferably springy, for example, spring bronze, and jaws 24b are inherently tensioned to close. Insertion of the wiper contact forces the jaws apart, after which the jaws tightly grip the contact, retaining it until forcibly pulled out. Below the straight upper portion of the breaker contact, it is crooked or bowed, with an intermediate leg of the contact at an angle to the upper portion. Just below the level of the housing sides 22L and 22R, a front nose extension 20a is formed which has somewhat of an inverted T-form. Either upper corner edge of the nose 20a serves as an anvil to displace the breaker blade or contact outwardly. To insert the breaker blade from the left side of the nose 20a, it must be slid upwardly past the upper left corner edge of the nose. As the upper portion of the blade is entered into the bite of the clasping jaw 24b, the intermediate leg of the blade is urged to the left by engagement with the upper left corner of the nose 20a. The blade if made of spring material is thereby tensioned so as to bring the lower bus blade contacting portion of the blade to its outward limit at the left side of the breaker unit. In effect, insertion of the blade (if springy) involves springing or snapping into place, with the upper straight portion entering the clasp jaws 24b and the intermediate leg bending past and hooking on an upper corner of the housing nose 20a. The blade may also be made as a rigid current carrying member and the resiliency could then be provided by a flexible clasp 24 or a separate spring. The opposite sides of the housing nose are symmetrical with respect to the laterally centered clip 24; therefore, it is evident that the breaker blade 12 can be interchangeably snapped into position at either side of the breaker unit. The outward limit of the lower portion of the breaker blade is preferably determined by abutment between the intermediate leg of the blade and a similarly slanted edge of lug 26 at the bottom of the housing sides 22L and 22R, depending on the location of the blade at the left or the right side of the breaker unit.

The housing nose 20a is formed with a recess 27 at the junction of each side with the base. When a breaker contact blade is in place, its inwardly bent lower tip is just above the base of the nose 20a and opposite the recess 27, thus being guarded by the base at all times while the recess permits intrusion therein of the lower blade tip when the blade is forced inwardly by engagement with the side of a bus blade.

The unit is mounted by properly locating the forward end of it over a stand having a slot, and pushing the forward end inwardly so that the stab fits into the slot while the wiper contact wipes against the bus bar blade. The inward movement is continued until the bus bar blade abuts the underside of the housing shoulder 26a. The engagement between the shoulder 26a and the bus bar blade stops further inward movement.

The internal pole structure including the trip mechanism may be any suitable known type, such as, for example, the structure including a magnetic trip shown in assignee's Patent 2,890,306 or a structure including a conventional thermal trip. For present purposes, the internal pole and trip structure need not be shown except for indication of the connection between the clasp 24 and one end of the trip element. As shown in FIG. 5, one end of a magnetic trip coil 29 is welded to the clip 24.

The construction of the two-pole breaker unit 2p whereby it mounts a breaker blade 12 at each side is similar to that of two single pole units 1p, except that the blades need not be removable. The two-pole unit, however, is generally with a common trip, or other means to effect common tripping.

FIG. 6 shows on a reduced scale the form of the 3-pole circuit breaker unit 3p for application to a 3-phase load center panel which includes an array of bus blades in A, B and C phase grouping. The breaker unit has a breaker blade 12 carried at each side in the manner explained for the one-pole unit 1p and, in addition, has a center receptive contact clip 35. As applied to the panel, the breaker blades engage the sides of A and C phase bus blades while the clip 35 has straddling engagement with an intervening B phase bus blade.

It is understood that since the conventional load center is being utilized, plug-in circuit breakers of standard width (approximately one inch) may be used together with the novel thin breaker in the same load center. The strands are of such height as not to interfere with the standard width breaker.

In accordance with an alternative embodiment of the invention illustrated in FIGS. 7, 8 and 9, the principle of a side-wiping contact member is employed on an adaptor.

The adaptor, best seen in FIGS. 7, 8, comprises an insulator body portion 41, preferably made of molded plastic and a depending stab 42. If the plastic is sufficiently tough, the stab may be integral with the body as shown. However, the stab may be made of metal, such as steel, and attached to the underside of the body 41. The adaptor stab 42 fits into the slot of the stand 14 in the same manner as the circuit-breaker stab 16 described above.

The forward part of the insulator body 41 is channeled to accommodate a side-wiping contact member 43. The contact member 43 covers one side of the insulator body 41, extends over one-half of the top and into the channel as shown. Preferably, the channel receiving end of the contact member 43 is shaped in the form of a loop and frictionally secures the contact member to the insulator body. The adaptor is preferably molded so that the side receiving the contact member 43 is shorter than the opposite side by an amount equal to the thickness of the contact member 43. Thus, when the side-wiping contact member is mounted on the insulator body, the breaker supporting surface is level, as best seen in FIG. 7.

The line end of the circuit breaker 1p is modified for electrical connection to the adaptor. The breaker comprises a conductive stab 44 which is connected to the internal mechanism of the breaker by the usual means.

The rear end of the breaker is connected to the panel board in the conventional manner, and the line end is simply inserted in the adaptor channel. The contact between the stab 44 and the member 43 is also of a wiping nature.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. In a panelboard having different polarity power busses from which parallel bus blades accessibly project in an array along the busses, the blades of one bus being so disposed in the array that any two adjacent blades are of different polarity;

detachable circuit breaker units, each including an exposed side contact surface for wiping engagement with one side only of a bus blade, and each breaker unit being disposed to the engaged side of the bus blade, and means on the panelboard coacting with the breaker units for operatively positioning said units between the blades in the array, with the side contact surfaces thereof each contiguous a blade.

2. The panelboard according to claim 1, wherein the means on the panel for operatively positioning the breaker units includes stands located alongside the bus blades, and interengaging means between the breaker units and the stands for keying the breaker units against lateral displacement and consequent loss of engagement between their side contact surfaces and the sides of the bus blades.

3. The panelboard according to claim 1, wherein the side contact surfaces are at the lower front corners of the sides of the breaker units, and wherein the means on the panelboard for operatively positioning the breaker units includes means for supporting and hooking the breaker units at the rear, and means alongside the bus blades for interlocking with the breaker units at the front.

4. The panelboard according to claim 1, wherein the breaker units include one-pole units, each with a pole-connected contact surface at one side only of the unit, and wherein the distance between adjacent bus blades is at least twice the breadth of the one-pole breaker unit to enable a pair of these units to be operatively positioned side by side between a pair of adjacent bus blades, with the side contact surface of one of the pair of units engaging a side of the contiguous bus blade and the side contact surface of the other of the pair of units engaging the confronting side of the adjacent, different polarity bus blade.

5. The panelboard according to claim 1, wherein the breaker units include two-pole units, each with contact surfaces at the opposite sides respectively connected to the two poles of the unit, the distance between adjacent bus blades being commensurate with the breadth of the two-pole unit to accommodate one such unit between the adjacent blades, with the opposite side contact surfaces of the two-pole unit respectively engaged with the confronting sides of the bus blades flanking the unit so as to serve the respective poles with different bus polarity.

6. The panelboard according to claim 1, wherein the side contact surfaces comprises contact blades protruding from sides of the breaker units and in flexed pressure engagement with the sides of bus blades when the breaker units are operatively positioned in the load center.

7. The panelboard according to claim 1, wherein the panelboard is a 3-phase center and includes a third bus with accessibly projecting blades located in said array between pairs of blades of the other two busses, so that the blades in the array are in groups of first, second and third phase blades, said breaker units being 3-pole units, each with contact surfaces at the opposite sides respectively connected to two of the poles and with a contacting member intermediate the sides and connected to the third pole and the breaker unit being applied to the bus blades with the side contact surfaces engaged with sides of the first and third phase bus blades in a group while the center contact engages the intervening second phase blade of the group.

8. A circuit breaker unit adapted for operative positioning relative to a bus blade, the circuit breaker unit comprising a case for a pole structure, a contact member carried by said case with a working portion of the contact member exposed at a side of the case for engagement with a side of the bus blade when the breaker unit is operatively positioned relative to the bus blade, the contact member extending from its working position into said case, means for preventing lateral retrograde of said contact member working portion into said case side, and means in the case conductively connecting the contacting member with the pole structure.

9. A circuit breaker unit adapted for operative positioning relative to a bus blade, the circuit breaker unit comprising a case for a pole structure, a resilient contact making metal breaker blade carried by said case with a working portion of the breaker blade protruding from a side of the case for engagement with a side of the bus blade when the breaker unit is operatively positioned relative to the bus blade, the breaker blade extending from its working portion into said case, means provided by the case for coacting with the breaker blade portion extending into the case to retain the breaker blade to the case and tension the breaker blade when the breaker unit is in operative position in a direction urging the working portion of the breaker blade laterally outward of the side of the case from which it protrudes so as to produce flexed pressure engagement of the working portion with the side of the bus blade, and means in the case conductively connecting the breaker blade with the pole structure.

10. The breaker according to claim 9, wherein the means provided by the case for coacting with the breaker blade portion extending into the case includes retaining means having retaining coaction with an inner end portion of the breaker blade and further includes means at the front and back sides of an intermediate leg of the breaker blade for restricting lateral play of the breaker blade.

11. The breaker according to claim 10, wherein the means at the back side of the intermediate leg of the breaker blade is laterally offset from the retaining means toward the side of the case from which the working portion of the breaker blade protrudes so as to serve as an anvil for flexing the breaker blade to impart said tension thereto.

12. The breaker according to claim 11, wherein the case includes a nose portion with an angular upper corner serving as the anvil at the back side of the intermediate leg of the breaker blade.

13. The breaker according to claim 12, wherein the intermediate leg of the breaker blade is at an angle relative to the inner end portion so as to effectively hook over the anvil corner of the nose portion of the case.

14. The breaker according to claim 13, wherein the means at the front side of the intermediate leg of the breaker blade defines the outward lateral protruding limit of the working portion of the breaker blade.

15. The breaker according to claim 14, wherein said retaining means comprises a clasp within the case for insertably receiving and releasably clamping the inner end portion of the breaker blade.

16. The breaker according to claim 15, wherein the external free tip of the breaker blade bends inwardly toward the side of the case from which the working portion of the blade protrudes, said nose portion including a base extending under and guarding the free blade tip in any lateral portion of the working portion of the blade.

17. The breaker according to claim 16, wherein the nose portion has an upright leg providing the upper corner which serves as the anvil element abutting the back side of the intermediate leg of the breaker blade, the base of the nose portion forming an interior angle with the upright leg, the vertex of this angle being recessed to accommodate said free tip of the breaker blade and hook the tip so as to prevent withdrawal of the breaker blade from the case when the working portion of the breaker blade is slid off the engaged side of a bus blade.

18. The breaker according to claim 9, wherein the means provided in the case for coacting with the breaker blade portion extending into the case comprises means for interchangeably mounting the breaker blade with its working portion exposed and protruding laterally at either side of the case.

19. The breaker according to claim 18, wherein said interchangeable means comprises a clasp in laterally centered position in the case for interchangeably receiving and releasably clamping the inner end portion of the breaker blade, and means symmetrically and laterally disposed relative to the clasp position for guiding the blade from either side of the case into the clasp and after entry of the inner end portion of the breaker blade into the clasp confining the blade by coaction with front and back sides of an intermediate leg thereof to the chosen side of the case.

20. The breaker according to claim 19, wherein said guiding and confining means including a nose portion in the case disposed below the clasp and including opposite angular upper corners of the nose portion, the intermediate leg of the breaker blade being at an angle to the inner end portion so as to hook effectively over the upper corner at the chosen side of the case, the angle of the leg and the lateral offset of the corner from the clasp position being such that the corner serves as an anvil for flexing the blade to tension it laterally outward of the chosen side of the case.

21. The breaker according to claim 20, wherein said case comprises an inner mounting core for the pole structure and opposite side cover plates attached to the core, said nose portion being a part of the core, the side plates being open at opposite sides of the nose portion to permit protrusion of the working portion of the breaker blade when the breaker blade is mounted to either side of the case, said clasp serving as a connecting link between the breaker blade and the pole structure.

References Cited by the Examiner
UNITED STATES PATENTS

| | | | |
|---|---|---|---|
| 2,601,147 | 6/52 | Jackson | 317—119 |
| 2,883,586 | 4/59 | Christensen | 317—119 |
| 2,934,679 | 4/60 | Johnson | 317—119 |
| 2,997,628 | 8/61 | St. John | 317—119 |
| 3,095,524 | 6/63 | Leonard et al. | 317—117 |

LARAMIE E. ASKIN, *Primary Examiner.*

JOHN F. BURNS, *Examiner.*